US005141582A

United States Patent [19]

Scott

[11] Patent Number: 5,141,582

[45] Date of Patent: Aug. 25, 1992

[54] LAY-UP SYSTEM

[75] Inventor: Mark A. Scott, Bend, Oreg.

[73] Assignee: PIW Industries, Inc., Portland, Oreg.

[21] Appl. No.: 581,636

[22] Filed: Sep. 12, 1990

[51] Int. Cl.[5] B32B 31/18

[52] U.S. Cl. 156/256; 156/264; 156/266; 156/267; 156/304.1; 156/516; 156/517; 144/346; 144/348

[58] Field of Search 156/256, 264, 266, 267, 156/304.1, 516, 517, 152, 258; 144/346, 348

[56] References Cited

U.S. PATENT DOCUMENTS 2,323,105 6/1943 Welch 156/264
3,003,541 10/1961 Prentice et al. 156/517
3,135,644 6/1964 Coplen et al. 156/517
4,314,871 2/1982 Weinstock et al. 156/264

*Primary Examiner*—Caleb Weston
*Attorney, Agent, or Firm*—Kolisch, Hartwell, Dickinson, McCormack & Heuser

[57] ABSTRACT

A method of producing panels from boards wherein a subassembly of boards is prepared on a conveyor and crowded against indexing pins. The trailing board in this subassembly is then cut lengthwise by a saw, to produce a panel assembly of predetermined width. Adhesive is then applied between contiguous edges of the boards in the panel assembly, and the boards then consolidated into an integral panel.

11 Claims, 4 Drawing Sheets

LAY-UP SYSTEM

This invention relates to lay-up apparatus usable to produce assemblies of boards wherein the boards of a given assembly when disposed edge-to-edge impart to the assembly a given predetermined width. The apparatus further may include means for applying an adhesive between what will be contiguous edges with the boards assembled, and a continuous press wherein this adhesive is cured and the boards in an assembly are formed into an integrated panel.

It is a common practice in making panels to assemble multiple boards (which may have a random, varying width) with the boards disposed edge-to-edge and extending in a common plane. Glue or adhesive applied between contiguous edges of these boards, when cured, forms an integrated product out of the boards. To produce a panel of a given width from such a consolidated product requires that the product be cut with a saw moving in a path which generally parallels the edges of the respective boards.

A problem with the process just briefly described is that with the boards being of random or varying width, for example, having widths ranging from 2 to 5½ to 6 inches, and with it desirable to produce a panel having a preselected total width of, for instance, 20 inches, in making the cut described there are chances that this cut will appear closely adjacent or at a glue line securing two boards together. As a result, a layer of adhesive or a relatively thin sliver of wood may be left which forms one of the edges in the panel being cut. This, of course, should be avoided. An additional problem with the process described is that it does not permit easy color matching of the boards which ultimately make-up a panel. With these disadvantages, either a certain amount of the product produced is discarded, or else the product which is produced is of inferior quality.

What the invention contemplates is a method and apparatus wherein a preassembly of boards is prepared with the boards laid edge-to-edge, but not bonded together to form one piece. To produce from this a panel assembly having a predetermined overall width, a cut is made extending parallel to the edges of the boards, in one of the boards of the preassembly of boards. In making the preassembly, it is known where this cut will be located, so that boards are selected whereby the board which is to be cut will be cut in a region well inwardly from its opposite edges. Furthermore, the boards in the preassembly may be selected to be color matched. After cutting, with the production of a panel assembly of predetermined overall width, the boards in this panel assembly have adhesive applied to appropriate edges, and the boards are consolidated into an integral panel.

Superior panels may be produced having the predetermined width desired. Grain and color may be matched where such is important. Board inspection, crowding, cutting, glue application, etc. may be performed at different stations appearing along the path of a processing line.

A general objection of the invention, therefore, is to provide a new and improved method and apparatus for producing a panel product from boards, where board selection and cutting are made before consolidation of the boards into a one piece panel.

Another object is to provide such a method and apparatus were inspection, board selection, cutting, adhesive application, and bonding are performed at stations following one another along a processing line.

These and other objects and advantages are attained by the invention, which is described hereinbelow in conjunction with the accompanying drawings, wherein.

Figure 1:
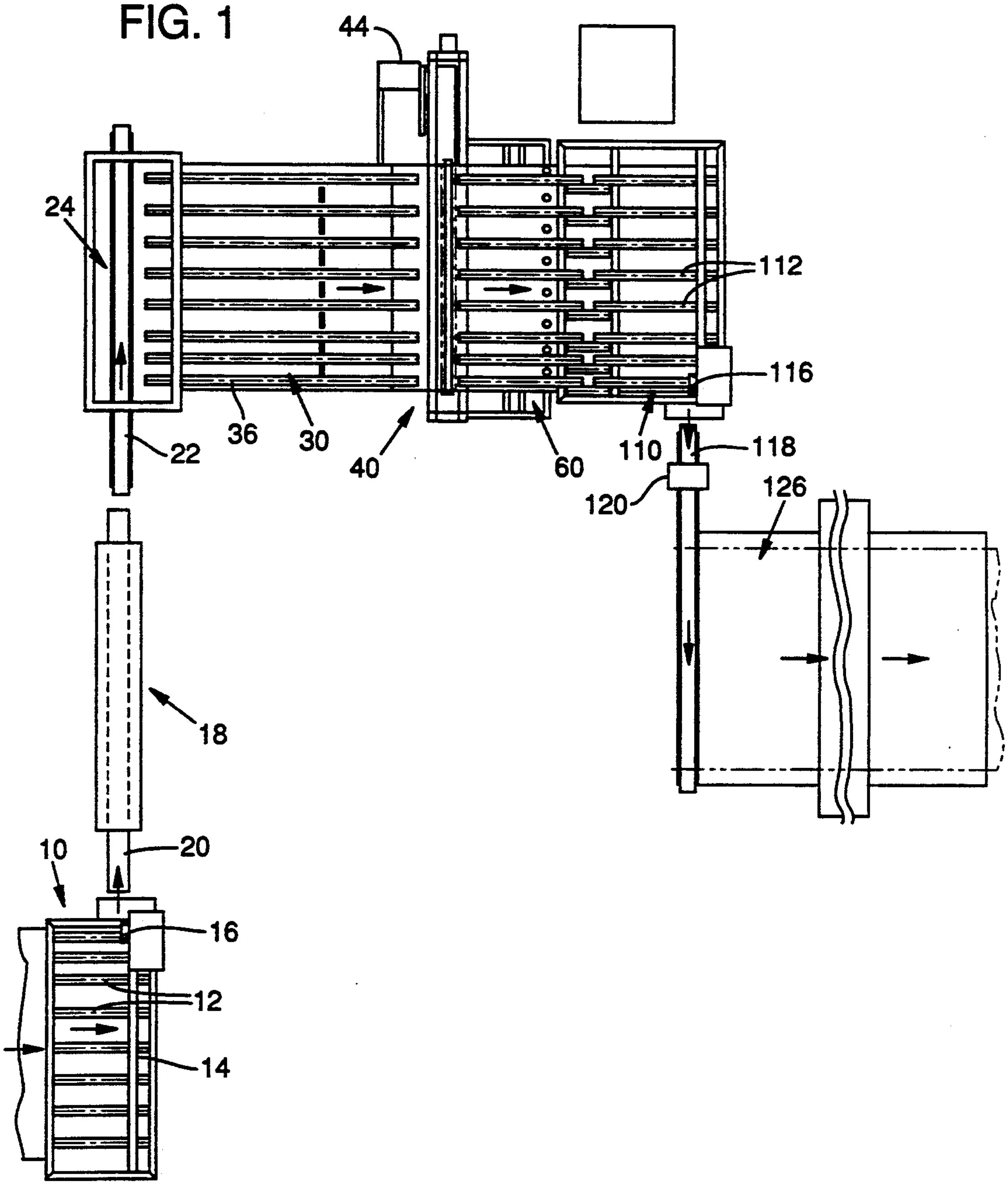
FIG. 1 is a plan view, in somewhat simplified form, illustrating the apparatus of the invention.

Referring now to the drawings, and more particularly to FIG. 1, boards, ordinarily of varying width, travel into the apparatus, while supported on a chain conveyor indicated at 10. This conveyor includes laterally spaced chains 12 trained over suitable power-rotated sprockets, and the conveyor is operable to move a board laterally to position an edge of the board against a fence 14. When moved in this manner, one end of the board travels under a raised feed roller, shown at 16.

The board then travels endwise through a moulder shown generally at 18. The moulder is of conventional construction, and includes the usual power-rotated moulder knives functioning to plane off material from a board traveling thereby. Travel through the moulder is produced by suitable means such, as the conveyor shown at 20. Travel into the moulder is initiated by dropping feed roller 16, whereby it falls against a board end disposed therebelow. The moulder may be what is known as a four-sided moulder, in that it planes off opposite faces and opposite side edges of a board traveling therethrough.

On leaving the moulder, a board travels on a moulder out-feed belt, shown at 22, into a station shown at 24. A rake-off mechanism 26 (see FIG. 2A) is then actuated, which moves the board laterally off the belt 22 onto an inspection conveyor 30. The rake-off mechanism may include chains, such as the one shown at 32 with means such as lugs 34 mounted on and extending from a chain which are moved across the out-feed belt to shift the board onto the inspection conveyor.

Figure 2A:
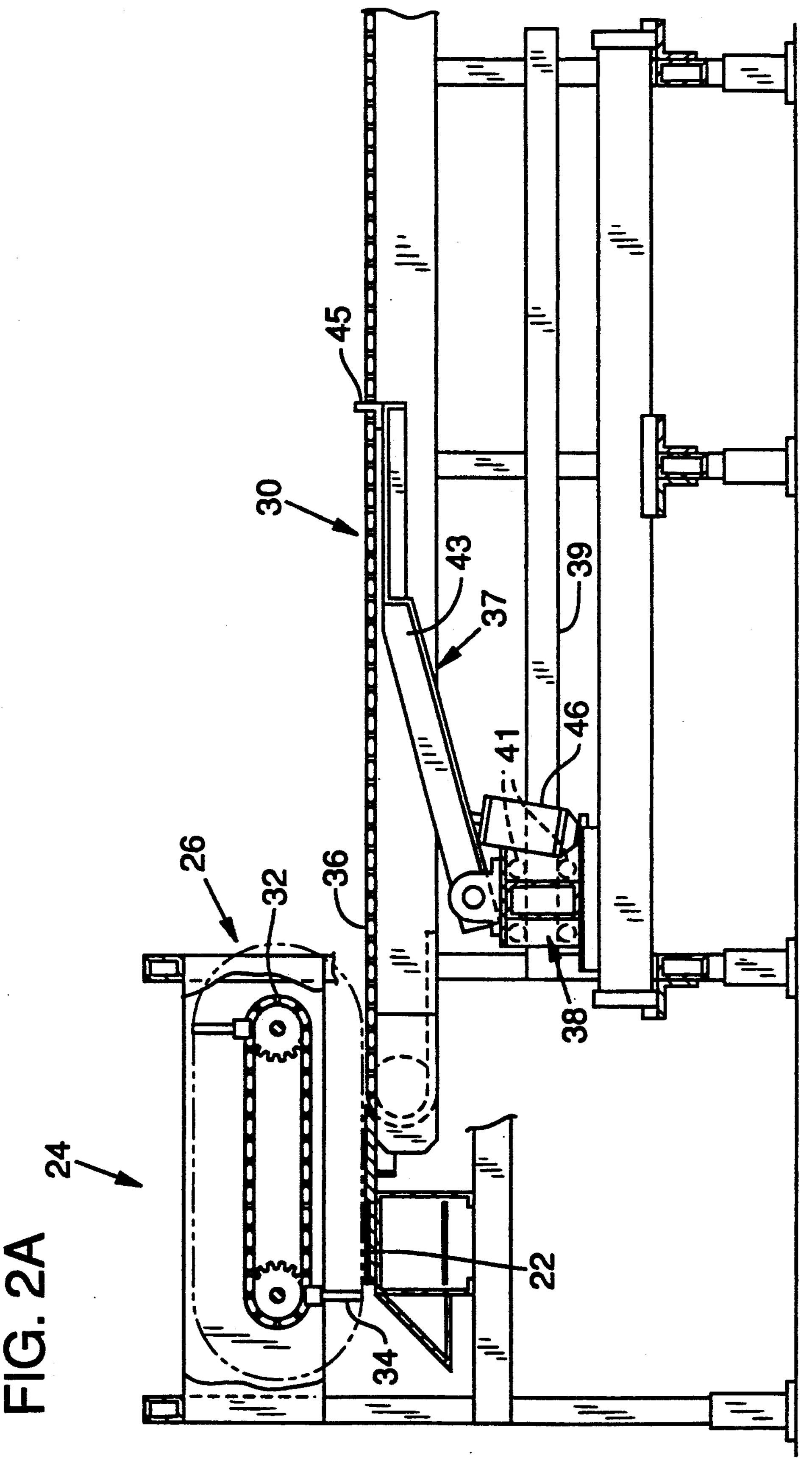
FIG. 2A is a cross-sectional elevational view, taken generally along the line 2A—2A in FIG. 1, but on a somewhat larger scale.
Figure 3:
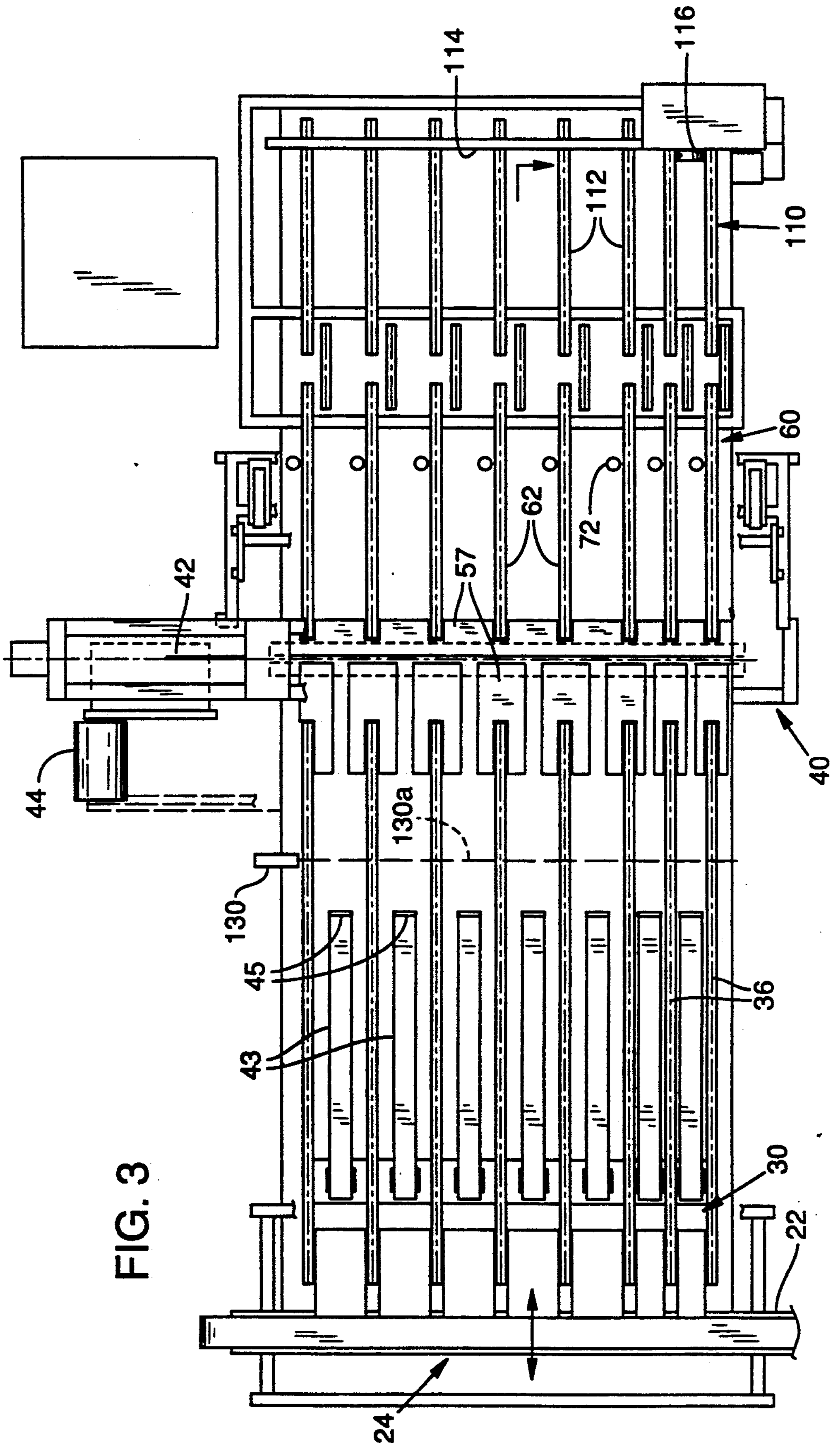
FIG. 3 is a plan view of a central portion of the apparatus shown in FIG. 1, but drawn on a slightly larger scale than FIG. 1.

Referring to FIG. 2A and FIG. 3, the inspection conveyor includes multiple chains or belts 36 disposed side-by-side and extending the length of the inspection conveyor. It is while boards are being conveyed on the inspection conveyor that an operator determines which boards are to make-up what is referred to herein as a preassembly of boards. The operator, by removing a board or placing another board in the board flow, or by changing the order of the boards on the conveyor, may produce preassemblies which have optimal color matching, and which also have, as the last board in the preassembly, a board of proper width to enable it to be cut lengthwise where desired and leave cut remainder pieces of substantial width on either side of where the cut occurred.

The inspection conveyor is provided with a crowding rake showing at 37. Specifically, disposed under chains 36 is a carriage 38 movably supported by rollers 41 on rails, such as rail 39. The carriage thus is movable in a direction paralleling the movement of product through the machine. Multiple arms 43 are pivotally mounted on the carriage, and these arms carry at their forward ends abutment elements 45. The arms are swung up and down between lowered and raised positions with piston-cylinders, such as the one shown at 46. With arms 43 lowered, boards are free to move on chains 36 over elements 45. With the arms raised, and the carriage moved from left to right in the drawings, any boards in advance of elements 45 are moved collectively forward.

Figure 2B:
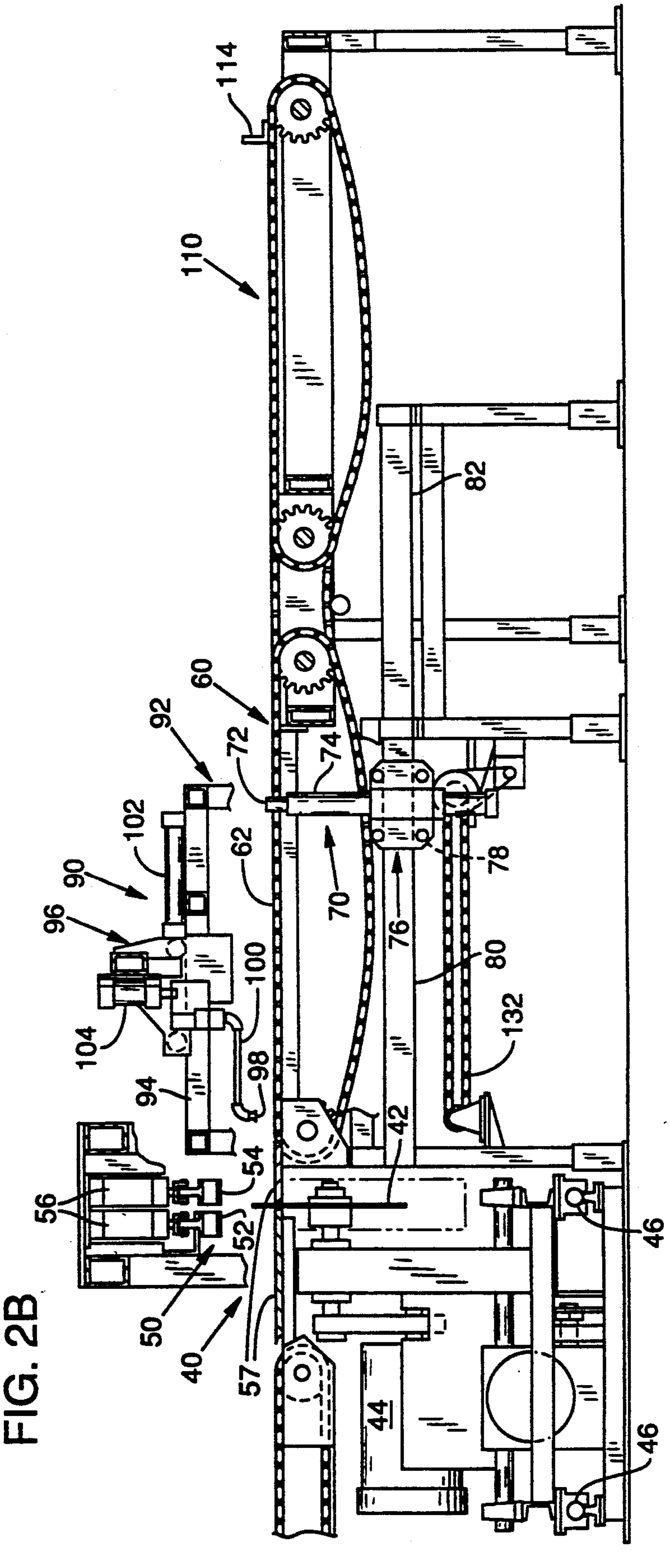
FIG. 2B is a cross-sectional elevational view, on the same scale as FIG. 2A, taken generally along the line 2B—2B in FIG. 1, the structure shown in FIG. 2B being a continuation of the structure shown in FIG. 2A.

Referring to FIG. 2B and FIG. 3, saw station in the apparatus is indicated at 40. The station is located downstream from the off-bearing ends of the conveyor belts in the inspection conveyor. The saw station includes a power-driven circular saw 42 suitably mounted on an arbor driven by a motor such as the one shown at 44. The motor, saw, and arbor are supported on a suitable carriage, and this carriage is supported on rails 46 for movement in a path extending transversely of the path of travel of boards through the apparatus.

As will be more fully described, a board in a subassembly is cut with a saw cut extending the length of the board while the board occupies the saw station 40. The board is clamped in place during this cutting by a clamp assembly shown at 50. This clamp assembly includes a clamp 52 disposed on one side of the path of the circular saw, and another clamp 54 disposed on the opposite side of the path of the saw. The clamps are shifted vertically, between clamping and release positions, by power-operated means, such as the cylinders shown at 56. Beneath the clamps is a table 57.

Downstream from the saw station is an out-feed conveyor 60. Such includes a plurality of laterally spaced belts or chains 62 suitably supported on sprockets, and with these powered so that the upper runs move from left to right as the conveyor is shown in the drawings.

An indexing pin assembly is shown at 70. The assembly includes a plurality of retractable and extendable pins, such as the one shown at 72, mounted for limited vertical movement in a mount 74. The mounts are suitably supported on a carriage 76. This carriage mounts rollers 78 which ride on rails, such as rail 80. Thus, the carriage is movable in a direction paralleling the path of travel of boards through the apparatus. Means, such as piston-cylinder 82, may be provided to shift and then hold the carriage at different adjusted positions on the rails supporting it. With the various pins extended, as by shifting them upwardly, the lead edge of the lead board in an assembly traveling down the apparatus comes up against the pins to have its movement stopped and to have its position indexed by these pins. The pins are retracted to permit boards to travel over the pin and forwardly in the apparatus. The width of a subassembly is determined by the particular adjusted position of carriage 76.

A board transfer mechanism is shown at 90. Such includes a frame 92 supporting guide rails, such as the one shown at 94, movably supporting a carriage 96. Carried on the carriage are multiple friction grippers, such as the one shown at 98. These are carried on the end of an arm, such as arm 100. The carriage is movable in a direction paralleling the conveyor chains through extension and contraction of piston-cylinder 102. The friction grippers are movable up and down, as by actuating piston-cylinders such as the one shown at 104.

With a board lying on table surface 57, such may be advanced forwardly, to be placed on the out-feed conveyor, by first moving carriage 96 rearwardly an appropriate distance, to place the friction grippers over the board. Lowering of the friction grippers then places them in contact with the board. Subsequent movement of the carriage in a downstream direction is effective to cause that board to be slid forwardly onto the out-feed conveyor.

Shown at 110 is a speedup conveyor. This, like conveyor 60, includes multiple laterally spaced chains or belts, as exemplified by the chain shown at 112. Boards move from the out-feed conveyor 60 onto the speedup conveyor 110, and with the speedup conveyor normally driven at a somewhat faster speed, a lateral spacing is produced between successive boards. This facilitates electronic counting of the boards traveling along the speedup conveyor.

A fence is shown at 114 at the end of the speedup conveyor. A board moves down the speedup conveyor to lie against this fence. One end of this board will fall under a roll 116. This roll, on command, is adjusted downwardly to clamp against this board end, and with the roll rotated, the board is fed lengthwise onto a belt 118 (see FIG. 1). Movement of the conveyor belt is effective to advance this board past a glue applicator, shown generally at 120.

In the glue applicator, glue is applied to an edge of the board. The applicator is controlled whereby the glue is applied to selected board edges only.

After leaving the glue applicator, the board is moved laterally in an appropriate manner to be fed into a continuous press, shown generally at 126. In the press, successive laterally spaced boards are crowded together, and radio frequency is applied, to produce curing of any glue or adhesive present between contiguous edges of adjacent boards.

Indicated at 130 in FIG. 3 is a light, which produces a line **130*a* of light on any product therebelow. This light line is spaced upstream from saw 42 the same distance that pins 72 are spaced downstream from the saw. Correlated movement between adjustment in the locations of the pins and adjustment in the position of the indicator light may be produced by any suitable means, including, as shown in FIG. 2B, the follower belt 132 which is moved in the apparatus a distance directly related to the adjusted movement produced in carriage 76**.

Explaining how the apparatus may be operated, and assuming start-up of the apparatus, the saw is positioned to one side of conveyors 30, 60, in an out-of-the-way position. Clamp 54 is lowered. Boards moved downwardly by the inspection conveyor are inspected and arranged by the operator, and a subassembly of boards is prepared, backed up from clamp 54, which has a width, with the boards edge-to-edge, somewhat exceeding the distance between clamp 54 and light line **130*a* of indicating light 130**. In fact, the board selection is made so that the upstream board in the subassembly will have considerable width, and will have a forward edge located well forwardly of this line and a rear edge located well rearwardly. The operator at this time can also lay up additional boards of another subassembly of boards rearwardly of the one just prepared.

The pins in the pin assembly have previously been adjusted to a raised position. With the first-mentioned subassembly prepared, clamp 54 is raised. The crowding rake is advanced to move the first subassembly and any other boards behind it forwardly, to shove the lead board in the subassembly against the pins. This results in the trailing board of this subassembly being positioned with opposite edges on either side of the saw kerf produced when saw 42 is moved in a cutting pass.

Both clamps of the clamp mechanism are then lowered to clamp the trailing board of the subassembly. The saw is caused to be moved in a cutting pass through the clamped board. What results is an assembly of boards extending from the saw kerf to the pins, referred to as a panel assembly, having a predetermined desired width. The rear board in this panel assembly is a cut board (one of the cut remainders of the board which earlier was positioned to extend to either side of the potential saw kerf line).

At the completion of the cutting pass, and after lowering of the pins, clamp 54 is raised and board transfer mechanism 90 is actuated to move this panel assembly forwardly onto the out-feed conveyor 60, with the boards then traveling onto conveyor 110.

With clamp 52 remaining lowered and clamping onto the upstream remainder of the board cut by the saw, another or second subassembly of boards is prepared extending upstream in the apparatus. This second subassembly will have an upstream or trailing board with margins lying on either side of the light line of the light 130, which is to say that it has the necessary width to extend to either side of a cut made through the board with the board occupying the saw station.

The pins are then raised, and with actuation of the crowding rake, this other or second subassembly of boards is crowded together against the raised pins. In this subassembly of boards, the lead board will be the other cut remainder of the first cut board. With actuation of the crowding rake, the trailing board of the second assembly is moved to occupy the saw station. With this board in the sawing station, the clamp mechanism is actuated to lower clamps 52, 54. A saw cut is made to produce another panel assembly disposed between the saw and the pins having a predetermined width.

Other panel assemblies may be similarly prepared. After making the first panel assembly, all subsequent panel assemblies will have a cut remainder of one board forming the lead board in the panel assembly, and the cut remainder of another board forming the trailing board in the panel assembly.

Boards in a panel assembly are counted on travel over the speedup conveyor. This count is utilized in controlling adhesive applicator 120. Adhesive is applied so as to appear only between contiguous edges of adjacent boards in the panel assembly. No adhesive is applied to edges of boards which will form edges of the ultimate panel.

After singulation and the application of adhesive, the boards in the panel assembly are reassembled to be disposed side-by-side. This panel assembly with the adhesive applied is then moved through the continuous press. The adhesive with crowding of the boards is cured in the press to produce an integral panel from the boards of a panel assembly.

It will be noted that with the method of the invention, a preselection of boards is made before the boards in the panel become joined to each other. Further, this preselection is made in a manner which results in a cut board of substantial width forming each of opposite margins of a completed panel. The operator knows in advance where a cut is to be made, and this cut is made before glue application and before bonding of boards to each other.

It should be obvious that the apparatus and method herein described promotes a more efficient use of boards having irregular widths. Final panels are produced with boards properly color matched and with glue lines in a panel well inwardly from opposite side edges of the panel.

While a particular embodiment of the invention has been described, obviously changes and variations are possible.

It is claimed and desired to secure by Letters Patent:

1. In the making of a panel from multiple boards disposed edge-to-edge, the method comprising:

preparing a preassembly of boards laid edge-to-edge, with a cut paralleling the edges of the boards cutting through a terminal board in said preassembly to produce a cut board from the terminal board which is narrower than the terminal board, producing a panel assembly which includes the cut board cut from the terminal board and the remaining boards of the preassembly, said panel assembly having a predetermined width dictated by where the cut is performed on the terminal board, the terminal board having a width selected to be sufficient to enable the cut that is performed to be made inwardly of opposite edges of the board throughout the length of the board, and bonding with an adhesive the boards of the panel assembly to produce the panel, the bonding being performed by separating the boards in the panel assembly and introducing adhesive to edges of the boards and the boards then being reassembled edge-to-edge to produce a reassembled panel assembly.

2. The method of claim 1, wherein before cutting of the terminal board the boards of the preassembly are crowded against a fixed stop and the terminal board is clamped in place.

3. The method of claim 1, wherein after separating of the boards in the panel assembly the boards are transported endwise past an adhesive station, an adhesive is applied by applying adhesive to selected edges of the boards as they are transported endwise, and the reassembled boards have these selected edges disposed internally.

4. In the making of a panel from multiple boards disposed edge-to-edge, the method comprising:

preparing a preassembly of boards laid edge-to-edge, crowding the boards of the preassembly against a fixed stop and clamping a terminal board in the preassembly thus to secure the terminal board, with the terminal board clamped and with a cut paralleling the edges of the boards cutting through the terminal board in the preassembly to produce a cut board from the terminal board which is narrower than the terminal board, producing a panel assembly which includes the cut board and the remaining boards of the preassembly, said panel assembly having a predetermined width dictated by where the cut is performed on the terminal board, and the terminal board having a width which is selected to enable the cut that is performed to extend along the board inwardly form its opposite edges throughout the length of the board, and bonding with an adhesive the boards of the panel assembly to produce the panel.

5. The method of claim 4, wherein bonding is performed by separating the boards in the panel assembly and transporting them endwise past an adhesive station, and the boards are then reassembled edge-to-edge to produce a reassembled panel assembly.

6. A method of making a panel from multiple boards disposed edge-to-edge comprising:

clamping a margin of a first board where said margin is adjacent an upstream edge of the first board, and while this margin is clamped, cutting the first board along its length in a region between its edges to produce an upstream cut remainder of the first board which includes said upstream edge and a downstream cut remainder of the first board, while the margin of the first board is clamped laying up plural side-by-side boards against said upstream edge to produce a preassembly of boards which includes the upstream cut remainder of the first board, other boards lying thereagainst, and a second board lying against the other boards, relaxing clamping of the upstream cut remainder of the first board and moving the preassembly of boards downstream to place the cut remainder against an indexing stop, clamping a margin of the second board which is adjacent an upstream edge of the second board and while this margin is clamped, cutting the board along its length in a region between its edges to produce a downstream cut remainder of the second board, and preparing an integral panel from the downstream cut remainder of the second board, said other boards and the upstream cut remainder of the first board.

7. In the making of a panel from multiple boards disposed edge-to-edge, the method comprising:

preparing a preassembly of boards with the boards laid edge-to-edge, crowding the boards against each other and while crowded, cutting a terminal board to produce two cut boards which are cut remainders of the terminal board, producing a panel assembly including uncut boards and a cut board which is one of the cut remainders of this terminal board, said panel assembly having a predetermined width dictated by where the cutting is performed, preparing another preassembly of boards from additional boards and the other cut remainder of the terminal board, crowding the boards in this other preassembly together and while crowded cutting another terminal board to produce two additional cut boards which are cut remainders of the other terminal board, preparing a panel assembly which includes uncut boards, the other cut remainder of the first cut terminal board and one of the cut remainders of the other terminal board and this panel assembly having a predetermined width dictated by where the second cutting is performed, and as the panel assemblies are prepared bonding together the boards in a panel assembly to produce a panel.

8. Lay-up apparatus comprising:

an elongate conveyor means for conveying boards in direction extending laterally of the boards, adjustable indexing means adjustable between an indexing and a non-indexing position for stopping the travel of boards on said conveyor means when in said indexing position, crowding means for crowding boards against said indexing means, clamp means for clamping a board crowded by said crowding means, and saw means movable in a path extending transversely of the conveyor means for lengthwise cutting of a board clamped by said clamp means, said path of the saw means being located upstream on said conveyor means from said indexing means.

9. The lay-up apparatus of claim 8, which further includes indicating means disposed upstream on said conveyor means from the path of said saw means for indicating a distance related to the distance of the path of the saw means upstream from said indexing means.

10. The apparatus of claim 9, which further includes a second conveyor means adjacent the off-bearing end of the first conveyor means for conveying boards lengthwise to one side of the first conveyor means, and selectively controlled adhesive applying means operable to apply adhesive to selected edges of boards conveyed by said second conveyor means.

11. The apparatus of claim 10, which further includes press means for receiving boards leaving said second conveyor means with the boards disposed edge-to-edge and crowded against each other.

* * * * *